US008922800B2

United States Patent
Rai et al.

(10) Patent No.: US 8,922,800 B2
(45) Date of Patent: Dec. 30, 2014

(54) METHODS AND SYSTEMS FOR SELECTING A LOCATION TO STORE A PRODUCTION CONSUMABLE

(71) Applicant: Xerox Corporation, Norwalk, CT (US)

(72) Inventors: Sudhendu Rai, Fairport, NY (US); Ranjit Kumar Ettam, Pradesh (IN); Raja Muthukrishnan Kalpana Padma, Chennai (IN); Marc Dennis Daniels, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 117 days.

(21) Appl. No.: 13/723,532

(22) Filed: Dec. 21, 2012

(65) Prior Publication Data

US 2014/0176973 A1 Jun. 26, 2014

(51) Int. Cl.
*G06F 3/12* (2006.01)
*G06K 15/00* (2006.01)
*G06K 15/02* (2006.01)
*G06Q 10/06* (2012.01)

(52) U.S. Cl.
CPC .............. *G06K 15/02* (2013.01); *G06F 3/1261* (2013.01); *G06Q 10/06* (2013.01); *G06F 3/1219* (2013.01)
USPC ......... 358/1.13; 358/1.9; 358/1.15; 358/1.16; 358/1.18; 709/203; 709/223; 709/226; 709/246; 718/102; 718/104; 718/107

(58) Field of Classification Search
None
See application file for complete search history.

(56) References Cited

U.S. PATENT DOCUMENTS

| | | | |
|---|---|---|---|
| 7,079,266 B1 * | 7/2006 | Rai et al. ..................... | 358/1.13 |
| 2008/0030768 A1 * | 2/2008 | Snyderman et al. ......... | 358/1.15 |
| 2009/0025000 A1 * | 1/2009 | Rai ............................. | 718/102 |
| 2009/0082902 A1 * | 3/2009 | Foltz et al. .................. | 700/214 |

OTHER PUBLICATIONS

Rai et al., "LPD Lean Document Production-O.R.-Enhanced Productivity Improvements for the Printing Industry", Interfaces, vol. 39, No. 1, Jan.-Feb. 2009, pp. 69-90.
Peerlinck et al., "A Design Method for Parts Picking Zones in a Manufacturing Environment", 8th Annual International Industrial Simulation Conference (ISC 2010).
Koster et al., "Design and Control of Warehouse Order Picking: A Literature Review", European Journal of Operational Research, 2007, 182, 481-501.
Gu et al., "Research on Warehouse Operation: A Comprehensive Review", European Journal of Operational Research, 2007, 177, 1-21.

(Continued)

*Primary Examiner* — Miya J Cato
(74) *Attorney, Agent, or Firm* — Fox Rothschild LLP

(57) ABSTRACT

A method of determining a location of one or more print production items in a storage facility may include identifying one or more print production items used by one or more autonomous production cells in a print shop, and determining, by a computing device, a demand value associated with each of the identified print production items. The demand value may represent a frequency with which the print production item is used by the autonomous production cells over a period of time. The method may include grouping the identified print production items into one or more groups based on the autonomous production cell that uses the identified print production items, assigning each group to an autonomous storage cell, and determining a location of one or more autonomous storage cells based on the demand values associated with the print production items in the group associated with the autonomous storage cell.

18 Claims, 8 Drawing Sheets

(56) References Cited

OTHER PUBLICATIONS

Heskett, "Cube-Per-Order Index—A Key to Warehouse Stock Location", Transportation and Distribution Management, Apr. 1963, vol. 3, 27-31.

Wutthisirisart, "Relation-Based Item Slotting", PHD Thesis at University of Missouri, Jul. 2010.

Yoon et al., "A Structured Procedure for Analysis and Design of Order Pick Systems", IIE Transactions, vol. 28, No. 5, 1996, pp. 379-389.

* cited by examiner

| DEPOT  |        |        |        |        |
|--------|--------|--------|--------|--------|
| SKU 2  | SKU 3  | SKU 17 | SKU 28 | SKU 38 |
| SKU 7  | SKU 1  | SKU 31 | SKU 33 | SKU 9  |
| SKU 4  | SKU 21 | SKU 18 | SKU 26 | SKU 24 |
| SKU 5  | SKU 34 | SKU 30 | SKU 22 | SKU 27 |
| SKU 6  | SKU 32 | SKU 37 | SKU 23 | SKU 25 |
| SKU 20 | SKU 29 | SKU 39 | SKU 13 | SKU 40 |
| SKU 19 | SKU 35 | SKU 14 | SKU 10 | SKU 12 |
| SKU 16 | SKU 11 | SKU 8  | SKU 36 | SKU 15 |

*FIG. 6*

| DEPOT (CELL C) |        | (CELL B) |        |        |
|--------|--------|--------|--------|--------|
| SKU 2  | SKU 3  | SKU 17 | SKU 19 | SKU 25 |
| SKU 7  | SKU 1  | SKU 21 | SKU 37 | SKU 34 |
| SKU 4  | SKU 16 | SKU 20 | SKU 38 | SKU 31 |
| SKU 5  | SKU 9  | SKU 13 | SKU 27 | SKU 32 |
| SKU 6  | SKU 8  | SKU 35 | SKU 22 | SKU 25 |
| SKU 11 | SKU 10 | SKU 39 | SKU 40 | SKU 33 |
| SKU 14 | SKU 12 | SKU 24 | SKU 36 | SKU 30 |
| SKU 13 | SKU 15 | SKU 23 | SKU 25 | SKU 23 |

*FIG. 7* — CELL A

METHODS AND SYSTEMS FOR SELECTING A LOCATION TO STORE A PRODUCTION CONSUMABLE

BACKGROUND

The process of retrieving items from storage locations in response to a specific customer request, often referred to as an order-picking process, is often the most laborious and costly activity in storage facilities. Factors that affect the performance and efficiency of order-picking operations include the layout of a storage facility, and the assignment strategy, routing method, picking strategies and batching method employed by a storage facility.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of determining a location of one or more print production items in a storage facility may include identifying one or more print production items used by one or more autonomous production cells in a print shop, and determining, by a computing device, a demand value associated with each of the identified print production items. The demand value may represent a frequency with which the print production item is used by the one or more autonomous production cells over a period of time. The method may include grouping the identified print production items into one or more groups based on the autonomous production cell that uses the identified print production items, assigning each group to an autonomous storage cell, and determining, by the computing device, a location of one or more autonomous storage cells based on the demand values associated with the print production items in the group associated with the autonomous storage cell.

In an embodiment, a system of determining a location of one or more print production items in a storage facility may include a computing device and a computer-readable storage medium in communication with the computing device. The computer-readable storage medium may include one or more programming instructions that, when executed, cause the computing device to identify one or more print production items used by one or more autonomous production cells in a print shop and determine a demand value associated with each of the identified print production items. The demand value represents a frequency with which the print production item is used by the one or more autonomous production cells over a period of time. The computer-readable storage medium may include one or more programming instructions that, when executed, cause the computing device to group the identified print production items into one or more groups based on the autonomous production cell that uses the identified print production items, assign each group to an autonomous storage cell, and determine a location of one or more autonomous storage cells based on the demand values associated with the print production items in the group associated with the autonomous storage cell.

BRIEF DESCRIPTION OF THE FIGURES

FIG. 4 illustrates an example placement of autonomous production cells according to an embodiment.

FIGS. 5, 6 and 7 illustrate examples of layouts of autonomous storage cells according to various embodiment.

DETAILED DESCRIPTION

Figure 1:
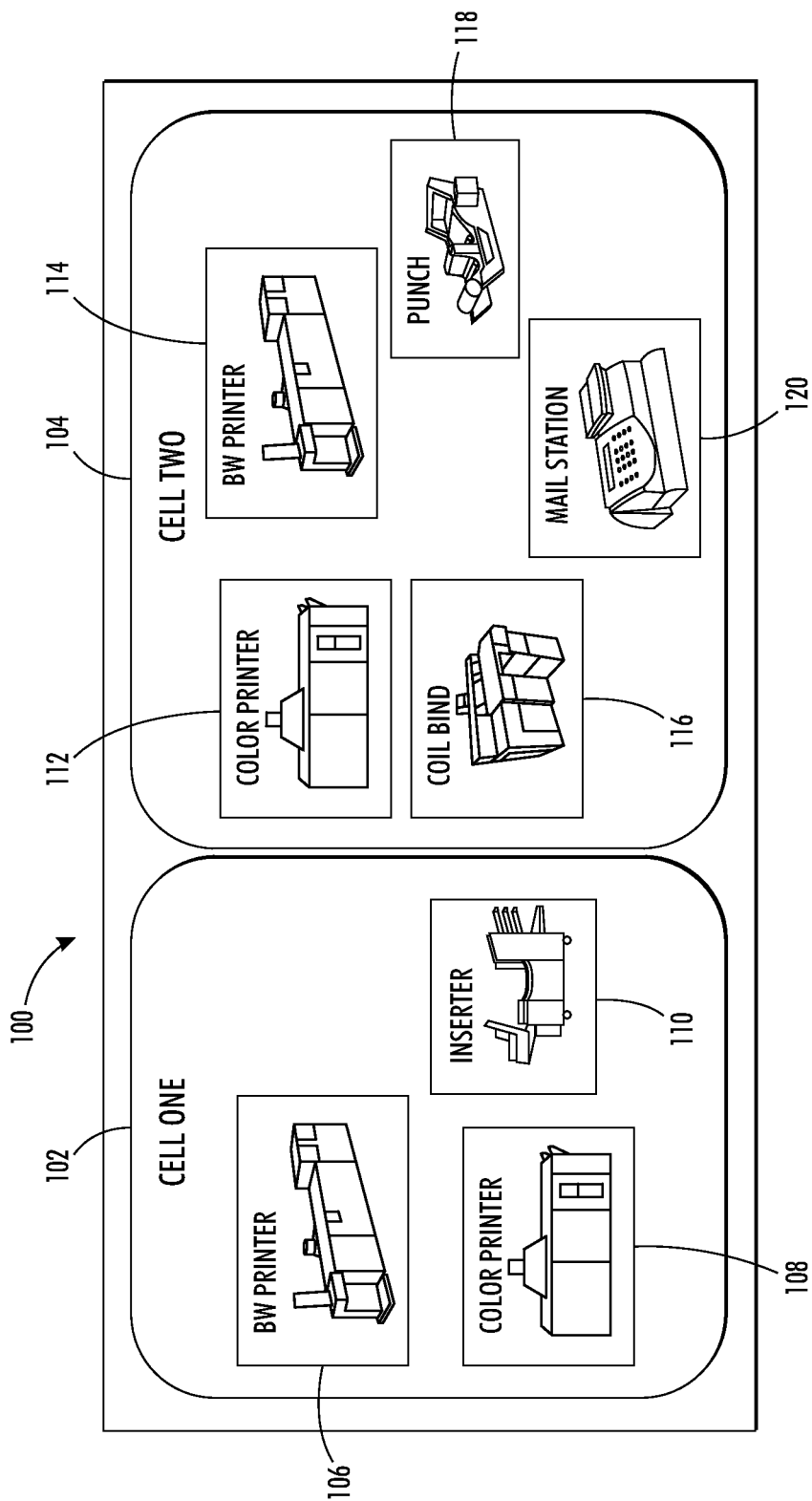
FIG. 1 illustrates an example of a print shop having two autonomous production cells according to an embodiment.

An "autonomous production cell" refers to one or more production devices and/or labor in a production environment that are capable of processing at least a portion of a job. For example, in a print shop, an autonomous production cell may include one or more print production devices that are capable of processing at least a portion of a print job. As another example, in a vehicle production environment, an autonomous production cell may include different areas and/or devices to assemble and/or finish portions of a vehicle such as, for example, the engine, the trim, and/or other parts. As another example, in a chemical production environment, an autonomous production cell may include one or more areas and/or devices for processing a chemical product. As another example, in a computing device production environment, an autonomous production cell may include one or more devices that are capable of manufacturing or producing at least a portion of a computing device such as, for example, a printer, a copier or a scanner. As another example, in a healthcare environment, an autonomous production cell may refer to one or more devices that are capable of providing healthcare services such as, for example, thermometers, meters, medical robots, pumps, surgical equipment and/or other devices.

An "autonomous storage cell" refers to one or more storage locations in a storage facility used to store one or more items.

A "function" refers to an operation performed by one or more production devices. Examples of functions pertaining to a print production device may include, without limitation, black-and-white printing, color printing, binding, punching, insertion and/or the like. Example functions in a vehicle production environment may include, for example, assembling parts, finishing parts and/or the like. Example functions in a chemical production environment may include, for example, mixing, heating, and/or the like. Examples of functions pertaining to a computing device production environment may include, without limitation, assembling parts, molding, packaging and/or the like. Example functions in a healthcare environment may include, without limitation, taking measurements associated with a patient such as, for example, temperature, vitals, heart rate, performing one or more procedures on or for a patient and/or the like.

An "item" refers to an article or unit that is used by a production environment to process one or more jobs. For example, in a print shop, an item may be a print production item. As another example, in an vehicle production environment, an item may be an automobile part such as, for example, a wheel, a door, a bumper and/or the like. As another example, in a chemical production environment, an item may be a chemical product, a piece of equipment, a tool and/or the like. Similarly, in a computing device production environment, an item may be a computing device part such as, for example, a motherboard, memory, parts for printers, scanners and/or copiers, tools, equipment and/or the like. In a healthcare environment, an item may be a medical form or one or more other items used to perform healthcare services such as, for example, syringes, thermometers, bandages, sponges and/or the like.

A "job" refers to a logical unit of work that is to be completed for a customer. A job may include one or more print jobs from one or more clients. A production system may include a plurality of jobs. Although the disclosed embodiments pertain to document production systems, the disclosed methods and systems can be applied to production systems in general. Example production environments may include, without limitation, a chemical production environment, a vehicle production environment, a computing device manufacturing production environment, a healthcare environment and/or other manufacturing production environments. For example, a job in a vehicle production environment may include manufacturing a vehicle or a portion thereof. As another example, a job in a chemical production environment may include producing or processing a chemical product or a portion thereof. Similarly, a job in a computing device production environment may be to manufacture a computing device or a portion thereof such as, for example, a printer, a scanner or a copier. Similarly, a job in a healthcare environment may be to perform one or more healthcare services on or for a patient.

A "print job" refers to a job processed in a print shop. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print production item" refers to a consumable used by a print shop to process one or more print jobs. Examples of print production items may include, without limitation, forms, inserts, envelopes, ink, toner and/or the like.

A "production device" device refers to a device used to process at least a portion of a job. Examples of production devices in a print shop may include, without limitation, printers, inserters, binders, punchers, collators, multi-function devices or other similar equipment and/or the like. Examples of production devices in a vehicle production environment may include assembly devices, finishing devices and/or the like. Examples of production devices in a chemical production environment may include chemical processing units, vessels, heating equipment, mixing equipment and/or the like. Example of production devices in a computing device production environment may include robots, assembly equipment and/or the like.

Examples of production devices in a healthcare environment may include medical devices and/or equipment.

A "storage facility" refers to a physical location used to store one or more items. An example of a storage facility may be a warehouse, a storage room and/or the like.

A production environment may include one or more autonomous production cells that each may include one or more production devices. In an embodiment, an autonomous production cell may include devices and/or labor that is capable of delivering at least one type of job. For example, in a print shop, an autonomous production cell may include production devices such as, for example, multiple printers, a shrink-wrapper and a computerized control system. A different autonomous production cell may include printers, cutters and copiers. In an embodiment, print jobs may be intelligently routed to autonomous production cells to provide desired load balancing and/or throughput. The use of autonomous production cells may help decrease the amount of work in progress and labor and inventory costs associated with processing jobs, and may increase the utilization of the production devices in a production environment.

FIG. 1 shows an example of a production environment 100, in this case, exemplary elements of a print shop. As illustrated by FIG. 1, a production environment may include two cells 102, 104. Cell One 102 may include a black-and-white printer 106, a color printer 108 and an inserter 110. Cell Two 104 may include a color printer 112, a black-and-white printer 114, a coil binder 116, a punch station 118 and a mail station 120.

In an embodiment, print jobs may enter the print shop manually or electronically and be collected at an electronic submission system such as a computing device and/or scanner. Jobs are sorted and batched at the submission system or another location before being delivered to one or more print engines such as a color printer, black-and-white printer and/or a continuous feed printer. Jobs may exit the print engine and be delivered to one or more finishing devices or areas such as a collator, cutter, and/or binder. The finishing areas may include automatic or manual areas for such finishing activities and they also may include an automatic or manual inserter. Finally, jobs may move to a postage metering station and/or shipping station. Jobs may move from one location to another in the print shop by automatic delivery or manual delivery such as by hand or by one or more paper carts. Additional and/or alternate production environments may be used within the scope of this disclosure.

Figure 2:
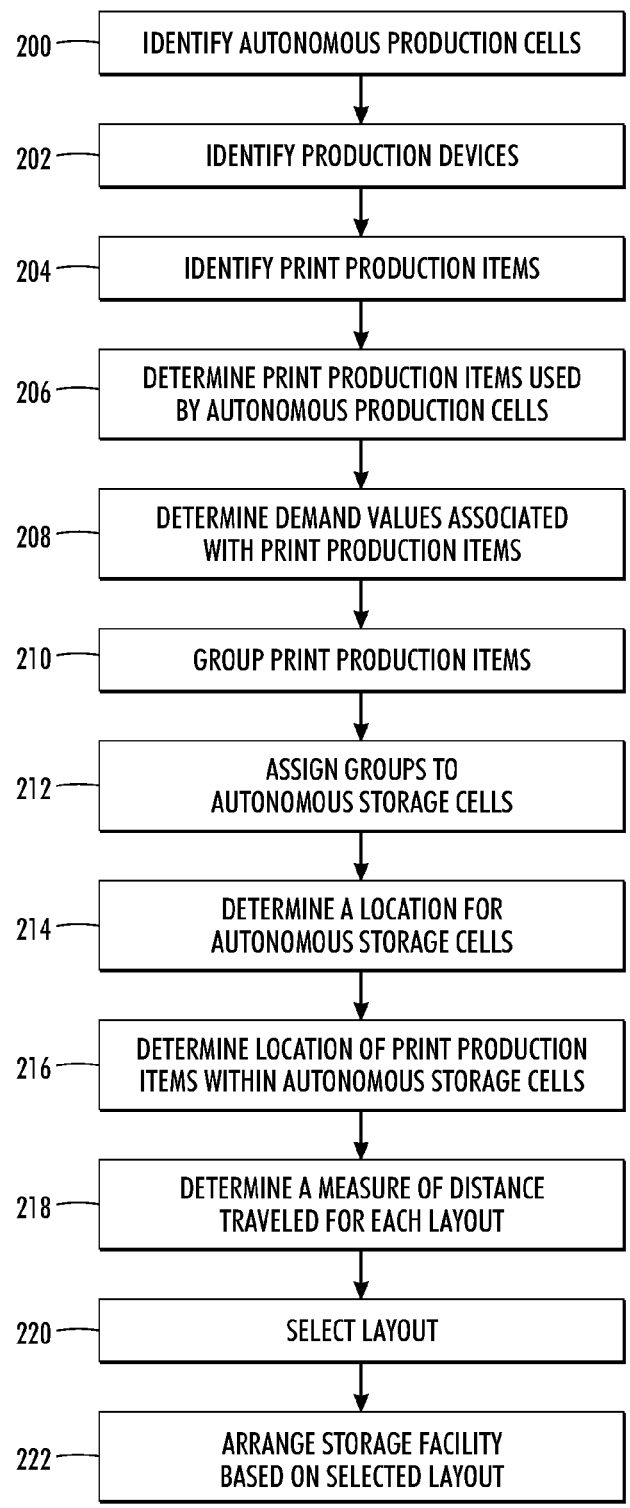
FIG. 2 illustrates a flow chart of an example method of determining a location of a print production item in a storage facility according to an embodiment.
Figure 3:
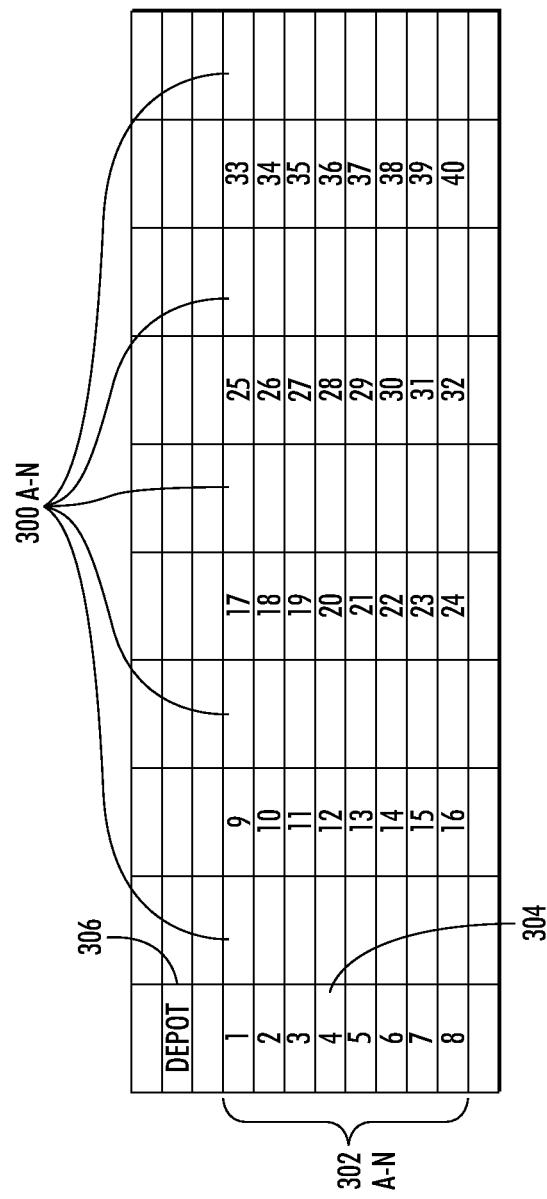
FIG. 3 illustrates an example storage facility layout according to an embodiment.

FIG. 2 illustrates a flow chart of an example method of determining a location of an item in a storage facility according to an embodiment. A storage facility may be a warehouse or any other location where items may be stored. FIG. 3 illustrates an example storage facility layout according to an embodiment. As illustrated by FIG. 3, a layout may include five aisles 300a-N, each having eight bins 302a-N. Each bin 302a-N may have approximately the same amount of space as the other bins, and items may be picked from only one side of the aisle 300a-N. The numbers corresponding to the bins 302a-N in FIG. 3 represent the SKU identifier of the item contained in the bin. For example, the bin 304 in FIG. 3 labeled '4' indicates that an item associated with SKU 4 resides in the bin. In an embodiment, a depot 306 may be located near an upper left corner of a storage facility as illustrated by FIG. 3. Additional and/or alternate storage facility layouts may be used within the scope of this disclosure.

As illustrated by FIG. 2, one or more autonomous production cells in a production environment may be identified 200. For example, referring to FIG. 1, two autonomous production cells 102, 104 may be identified 200 for the illustrated print shop 100.

Referring back to FIG. 2, in an embodiment, one or more production devices in one or more identified autonomous production cells may be identified 202. For example, referring to FIG. 1, the black-and-white printer, color printer and inserter may be identified 202 as production devices in the first autonomous production cell 102.

In an embodiment, one or more items may be identified 204. In an embodiment, a function may be associated with one or more items that may be necessary and/or recommended for performing that function. For example, a black-and-white printing function may require different form types. If a black-and-white print function requires four different form types (e.g., form type A, form type B, form type C and form type D), each form type may be considered an associated print production item. As another example, an insert function may include three different insert types (e.g., insert type 1, insert type 2 and insert type 3).

In an embodiment, one or more items may have a corresponding stock keeping unit (SKU) identifier by which the item may be identified 204. For example, an SKU may be read by a scanner or other computing device, and the read information from the SKU may be used by a computing device to identify a print production item. A SKU identifier may be unique to a print production item or to a type of item. For example, in an embodiment, each print production item may be associated with a unique SKU identifier. In an embodiment, each item of a particular type of print production item may be associated with the same SKU identifier. For example, all form type A's may be associated with the same SKU identifier. Table 2 illustrates example SKU identifiers associated with example functions according to an embodiment. For example, as illustrated by Table 1, a punch function may be associated with one or more print production items having SKU identifiers 17, 18, 19, 20 and 21.

TABLE 1

| Function | List of Items | | | | | | | | |
|---|---|---|---|---|---|---|---|---|---|
| BWPrinting | SKU 1 | SKU 2 | SKU 3 | SKU 4 | SKU 5 | SKU 6 | SKU 7 | | |
| ColorPrinting | SKU 8 | SKU 9 | SKU 10 | SKU 11 | SKU 12 | SKU 13 | SKU 14 | SKU 15 | SKU 16 |
| Punch | SKU 17 | SKU 18 | SKU 19 | SKU 20 | SKU 21 | | | | |
| CoilBind | SKU 22 | SKU 23 | SKU 24 | SKU 25 | SKU 26 | SKU 27 | | | |
| Insert | SKU 28 | SKU 29 | SKU 30 | SKU 31 | SKU 32 | SKU 33 | SKU 34 | | |
| Mail | SKU 35 | SKU 36 | SKU 37 | SKU 38 | SKU 39 | SKU 40 | | | |

In an embodiment, the item or items used by one or more autonomous cells may be determined 206. This determination may be based on, at least in part, historical job demand information. Historical job demand information may include information pertaining to the processing of one or more jobs by one or more autonomous productions cells in a production environment over a period of time. For example, historical print job demand information may include information pertaining to the processing of one or more print jobs by one or more autonomous production cells in a print shop. Job demand data may include, for one or more jobs, a job identifier, an arrival date and/or time, a due date and/or time, a quantity, a number of units associated with one or more functions, one or more items associated with one or more functions and/or the like.

In an embodiment, a demand value associated with one or more items used by one or more autonomous production cells in the production environment may be determined 208. A demand value may represent a frequency with which an autonomous cell uses an item over a period of time. For example, if an autonomous cell utilized form type A 15 times over a time period, a demand value associated with form type A and the autonomous production cell may be '15.' Additional and/or alternate demand values may be used within the scope of this disclosure.

In an embodiment, items may be grouped 210 according to which autonomous cells they are used by. For example, all items used exclusively by one autonomous production cells may be grouped 210, while items used exclusively by another autonomous production cell may be separately grouped 210. In an embodiment, items used by more than one autonomous production cell may be grouped 210 together.

Tables 2-4 illustrates example items (identified by SKU), corresponding autonomous cells from FIG. 1, and corresponding demand values according to an embodiment. Table 2 illustrates items used only by Cell 1 from FIG. 1. Table 3 illustrates print production items used only by Cell 2 from FIG. 1. Table 4 illustrates items used by both Cell 1 and Cell 2.

TABLE 2

| SKU | Autonomous Production Cell | Demand Value |
|---|---|---|
| SKU 34 | Cell 1 | 35 |
| SKU 33 | Cell 1 | 29 |
| SKU 32 | Cell 1 | 32 |
| SKU 31 | Cell 1 | 33 |
| SKU 30 | Cell 1 | 29 |
| SKU 29 | Cell 1 | 29 |
| SKU 28 | Cell 1 | 30 |

TABLE 3

| SKU | Autonomous Production Cell | Demand Value |
|---|---|---|
| SKU 40 | Cell 2 | 19 |
| SKU 39 | Cell 2 | 25 |
| SKU 38 | Cell 2 | 26 |
| SKU 37 | Cell 2 | 28 |
| SKU 36 | Cell 2 | 19 |
| SKU 35 | Cell 2 | 28 |
| SKU 27 | Cell 2 | 21 |
| SKU 26 | Cell 2 | 26 |
| SKU 25 | Cell 2 | 19 |

TABLE 3-continued

| SKU | Autonomous Production Cell | Demand Value |
|---|---|---|
| SKU 24 | Cell 2 | 21 |
| SKU 23 | Cell 2 | 20 |
| SKU 22 | Cell 2 | 21 |
| SKU 21 | Cell 2 | 37 |
| SKU 20 | Cell 2 | 35 |
| SKU 19 | Cell 2 | 32 |
| SKU 18 | Cell 2 | 30 |
| SKU 17 | Cell 2 | 38 |

TABLE 4

| SKU | Autonomous Production Cell | Demand Value |
|---|---|---|
| SKU 10 | Cell 2, Cell 1 | 11, 9 |
| SKU 9 | Cell 2, Cell 1 | 12, 10 |
| SKU 8 | Cell 2, Cell 1 | 11, 10 |
| SKU 7 | Cell 2, Cell 1 | 45, 26 |
| SKU 6 | Cell 2, Cell 1 | 37, 22 |
| SKU 5 | Cell 2, Cell 1 | 36, 29 |
| SKU 4 | Cell 2, Cell 1 | 42, 24 |
| SKU 3 | Cell 2, Cell 1 | 35, 31 |
| SKU 2 | Cell 2, Cell 1 | 44, 28 |
| SKU 1 | Cell 2, Cell 1 | 39, 24 |

TABLE 4-continued

| SKU | Autonomous Production Cell | Demand Value |
|---|---|---|
| SKU 16 | Cell 2, Cell 1 | 17, 12 |
| SKU 15 | Cell 2, Cell 1 | 12, 3 |
| SKU 14 | Cell 2, Cell 1 | 15, 7 |
| SKU 13 | Cell 2, Cell 1 | 10, 11 |
| SKU 12 | Cell 2, Cell 1 | 10, 8 |
| SKU 11 | Cell 2, Cell 1 | 17, 9 |

In an embodiment, each group of items may be assigned 212 to an autonomous storage cell. For example, referring above, the print production items having SKUs identified in Table 2 may be assigned 212 to autonomous storage Cell A, the print production items having SKUs identified in Table 3 may be assigned 212 to autonomous storage Cell B, and the print production items having SKUs identified in Table 4 may be assigned 212 to autonomous storage Cell C.

In an embodiment, a location for one or more autonomous storage cells may be determined 214. A location for an autonomous storage cell may be determined 214 based on the demand values associated with the print production items within the storage cell. In an embodiment, a total item frequency may be determined for each autonomous storage cell. A total item frequency may be the sum of the demand values associated with each print production item within an autonomous storage cell. Tables 5-8 illustrate examples of total item frequency values for autonomous storage cells Cell A, Cell B, and Cell C.

TABLE 5

| | Cell A | | | | | | | |
|---|---|---|---|---|---|---|---|---|
| | SKU | | | | | | | Total Item Frequency Value |
| | SKU 34 | SKU 33 | SKU 33 | SKU 31 | SKU 30 | SKU 29 | SKU 28 | |
| Item Frequency Value | 35 | 29 | 32 | 33 | 29 | 29 | 30 | 217 |

TABLE 6

| | Cell B | | | | | | | | |
|---|---|---|---|---|---|---|---|---|---|
| | SKU | | | | | | | | |
| | SKU 40 | SKU 39 | SKU 38 | SKU 37 | SKU 36 | SKU 35 | SKU 27 | SKU 26 | SKU 25 |
| Item Frequency Value | 19 | 25 | 26 | 28 | 19 | 28 | 21 | 26 | 19 |

| | SKU | | | | | | | Total Item Frequency |
|---|---|---|---|---|---|---|---|---|
| | SKU 24 | SKU 23 | SKU 22 | SKU 21 | SKU 20 | SKU 19 | SKU 18 | SKU 17 | |
| Item Frequency Value | 21 | 20 | 21 | 27 | 25 | 32 | 20 | 38 | 445 |

TABLE 7

| | Cell C | | | | | | | | |
|---|---|---|---|---|---|---|---|---|---|
| | SKU | | | | | | | | |
| | SKU 10 | SKU 9 | SKU 8 | SKU 7 | SKU 6 | SKU 5 | SKU 4 | SKU 3 | SKU 2 |
| Item Frequency Value | 20 | 22 | 21 | 71 | 59 | 65 | 66 | 66 | 72 |

| | SKU | | | | | | | Total Item Frequency |
|---|---|---|---|---|---|---|---|---|
| | SKU 1 | SKU 16 | SKU 15 | SKU 14 | SKU 13 | SKU 12 | SKU 11 | |
| Item Frequency Value | 63 | 29 | 15 | 22 | 21 | 18 | 26 | 656 |

Figures 4, 5:
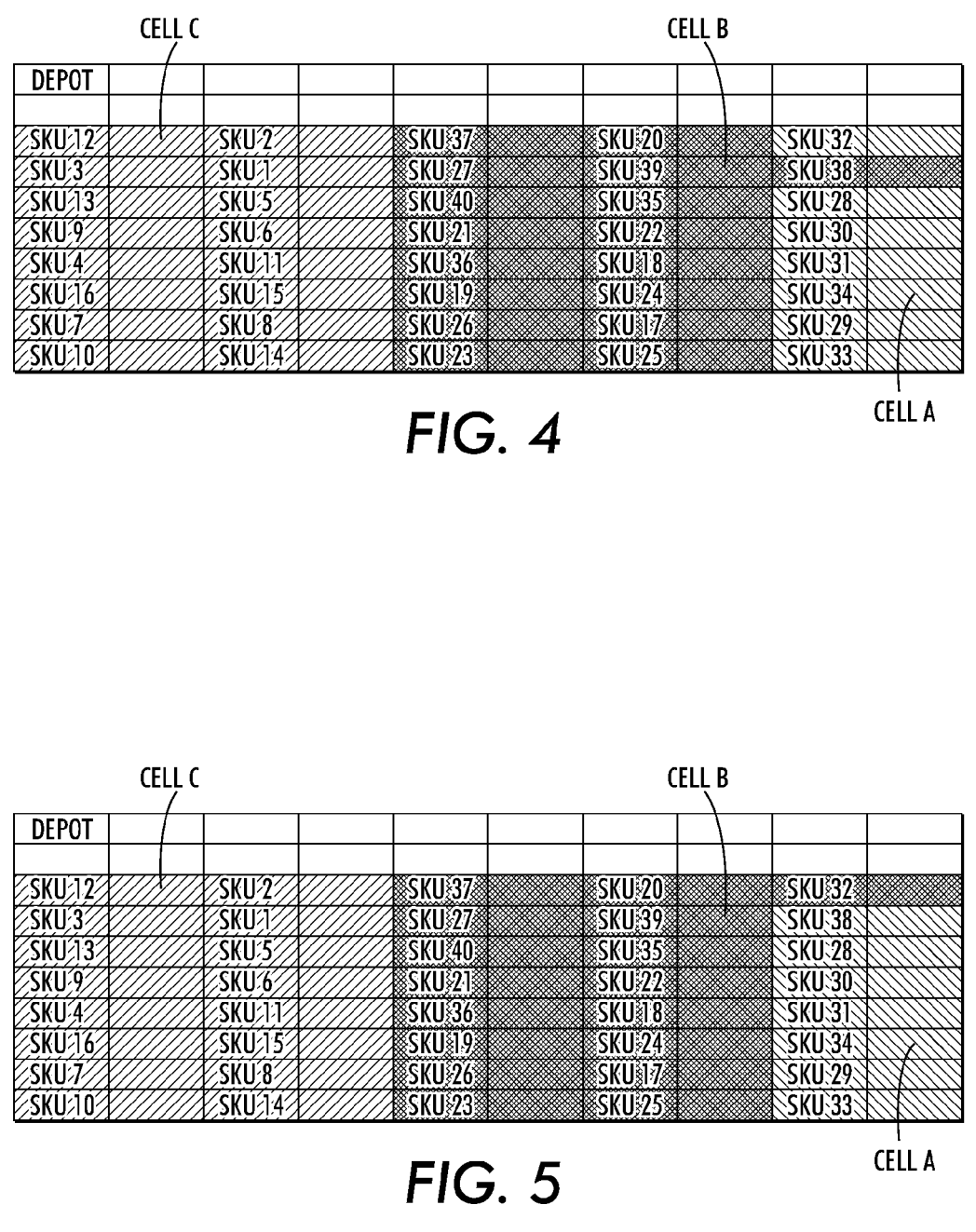

In an embodiment, the autonomous storage cell associated with the highest total item frequency value may be assigned to the closest location to the depot. The autonomous storage cell having the second highest total item frequency value may be assigned to the next closest location to the depot and so on. FIG. 4 illustrates the placement of Cell A, Cell B and Cell C in a storage location based on the total item frequency values illustrated in Tables 5-7. For example, as shown in FIG. 4, Cell C is assigned to a location closest to the depot because Cell C has the highest total item frequency value. Cell B is assigned the second closest location to the depot, and Cell A is assigned the furthest location from the depot.

In an embodiment, the location of items within one or more autonomous storage cells may be determined 216. In an embodiment, the location of one or more items within an autonomous storage cell may be determined 216 randomly. The location of one or more items within all autonomous storage cells in a storage facility may be determined 216 randomly to determine a first possible layout. FIG. 5 illustrates a possible layout associated with the autonomous storage cells illustrated in FIG. 4 according to an embodiment.

In an embodiment, a cube per order index (COI) policy may be used to determine 216 the location of one or more items within one or more autonomous storage cells according to an embodiment. In an embodiment, a COI-based storage policy may be used to determine a frequency with which an item is picked. A COI value may represent the value of an amount of allocated space for an item divided by the item frequency value associated with the item. In an embodiment, if the amount of allocated space is the same for all items, then this variable may have a constant value. For example, a value of '1' may be used. Additional and/or alternate values may be used within the scope of this disclosure.

Table 8 illustrates example COI values according to an embodiment. Table 9 illustrates example distances of storage locations from a depot for the layout shown in FIG. 3 according to an embodiment.

TABLE 8

| SI. No. | SKU Name | COI |
| --- | --- | --- |
| 1 | SKU 2 | 0.0139 |
| 2 | SKU 7 | 0.0141 |
| 3 | SKU 4 | 0.0143 |
| 4 | SKU 3 | 0.0145 |
| 5 | SKU 5 | 0.0149 |
| 6 | SKU 1 | 0.0152 |
| 7 | SKU 6 | 0.0164 |
| 8 | SKU 21 | 0.0256 |
| 9 | SKU 17 | 0.0263 |
| 10 | SKU 20 | 0.0270 |
| 11 | SKU 34 | 0.0286 |
| 12 | SKU 31 | 0.0303 |
| 13 | SKU 19 | 0.0313 |
| 14 | SKU 32 | 0.0313 |
| 15 | SKU 18 | 0.0323 |
| 16 | SKU 28 | 0.0333 |
| 17 | SKU 16 | 0.0345 |
| 18 | SKU 29 | 0.0345 |
| 19 | SKU 30 | 0.0345 |
| 20 | SKU 33 | 0.0345 |
| 21 | SKU 35 | 0.0357 |
| 22 | SKU 37 | 0.0357 |
| 23 | SKU 26 | 0.0370 |
| 24 | SKU 38 | 0.0370 |
| 25 | SKU 11 | 0.0385 |
| 26 | SKU 39 | 0.0400 |
| 27 | SKU 22 | 0.0435 |
| 28 | SKU 9 | 0.0455 |
| 29 | SKU 14 | 0.0455 |
| 30 | SKU 23 | 0.0455 |
| 31 | SKU 24 | 0.0455 |
| 32 | SKU 8 | 0.0476 |
| 33 | SKU 13 | 0.0476 |
| 34 | SKU 27 | 0.0476 |
| 35 | SKU 10 | 0.0500 |
| 36 | SKU 25 | 0.0526 |
| 37 | SKU 36 | 0.0526 |
| 38 | SKU 40 | 0.0526 |
| 39 | SKU 12 | 0.0556 |
| 40 | SKU 15 | 0.0667 |

TABLE 9

| SI No. | Location Index | Distance from Depot |
| --- | --- | --- |
| 1 | 1 | 3 |
| 2 | 2 | 4 |
| 3 | 3 | 5 |
| 4 | 9 | 5 |
| 5 | 4 | 6 |
| 6 | 10 | 6 |
| 7 | 5 | 7 |
| 8 | 11 | 7 |
| 9 | 17 | 7 |
| 10 | 6 | 8 |
| 11 | 12 | 8 |
| 12 | 18 | 8 |
| 13 | 7 | 9 |
| 14 | 13 | 9 |
| 15 | 19 | 9 |
| 16 | 25 | 9 |
| 17 | 8 | 10 |
| 18 | 14 | 10 |
| 19 | 20 | 10 |
| 20 | 26 | 10 |
| 21 | 15 | 11 |
| 22 | 21 | 11 |
| 23 | 27 | 11 |
| 24 | 33 | 11 |
| 25 | 16 | 12 |
| 26 | 22 | 12 |
| 27 | 28 | 12 |
| 28 | 34 | 12 |
| 29 | 23 | 13 |
| 30 | 29 | 13 |
| 31 | 35 | 13 |
| 32 | 24 | 14 |
| 33 | 30 | 14 |
| 34 | 36 | 14 |
| 35 | 31 | 15 |
| 36 | 37 | 15 |
| 37 | 32 | 16 |
| 38 | 38 | 16 |
| 39 | 39 | 17 |
| 40 | 40 | 18 |

FIG. 6 illustrates an example layout based on the values illustrated by Table 8 and Table 9 according to an embodiment.

Table 10 illustrates example COI values for the items within Cell C according to an embodiment. The COI values illustrated in Table 10 were determined using a value of '1' for the amount of space allocated for each item.

TABLE 10

| SKU | Item Frequency Value | COI Value | SKU | Item Frequency Value | COI Value |
| --- | --- | --- | --- | --- | --- |
| SKU 12 | 18 | 0.05555 | SKU 2 | 72 | 0.01388 |
| SKU 3 | 66 | 0.01515 | SKU 1 | 63 | 0.01587 |

TABLE 10-continued

| SKU | Item Frequency Value | COI Value | SKU | Item Frequency Value | COI Value |
|---|---|---|---|---|---|
| SKU 13 | 21 | 0.04762 | SKU 5 | 65 | 0.01538 |
| SKU 9 | 22 | 0.04545 | SKU 6 | 59 | 0.01695 |
| SKU 4 | 66 | 0.01515 | SKU 11 | 26 | 0.03846 |
| SKU 16 | 29 | 0.03448 | SKU 15 | 15 | 0.06666 |
| SKU 7 | 71 | 0.01408 | SKU 8 | 21 | 0.04762 |
| SKU 10 | 20 | 0.04000 | SKU 14 | 22 | 0.04545 |

FIG. 7 illustrates a possible layout of print production items within autonomous storage cells determined using a COI policy according to an embodiment. As illustrated by FIG. 7, the print production items having the lowest COI values from Table 10 are located closest to the depot within Cell C, while the print production items having the highest COI values are located furthest from the depot within Cell C.

In an embodiment, a measure of a distance traveled may be determined 218 for the layout in which items are placed within autonomous cells randomly and the layout in which items are placed within autonomous cells according to a COI policy.

In an embodiment, a pick order may be identified. A pick order may be an order in which one or more items are obtained from an autonomous storage cell to process a job. Table 11 illustrates an example of a pick order for an example print job according to an embodiment.

TABLE 11

| Function | List of Items | | | | | | | |
|---|---|---|---|---|---|---|---|---|
| BWPrinting | SKU 1 | SKU 2 | SKU 3 | SKU 4 | SKU 5 | SKU 6 | SKU 7 | |
| ColorPrinting | SKU 8 | SKU 9 | SKU 10 | SKU 11 | SKU 12 | SKU 13 | SKU 14 | SKU 15 | SKU 16 |
| Punch | SKU 17 | SKU 18 | SKU 19 | SKU 20 | SKU 21 | | | |
| Bind | SKU 22 | SKU 23 | SKU 24 | SKU 25 | SKU 26 | SKU 27 | | |
| Insert | SKU 28 | SKU 29 | SKU 30 | SKU 31 | SKU 32 | SKU 33 | SKU 34 | |
| Mail | SKU 35 | SKU 36 | SKU 37 | SKU 38 | SKU 39 | SKU 40 | | |

Although Table 11 illustrates example print production items associated with certain functions, not all of the print production items may be necessary to process a print job having the function. For example, referring to Table 11, a print job requiring black-and-white printing may utilize one or more print production items having SKU identifiers 1-7. However, depending on the parameters of the print job, the print job may require any combination of SKU identifiers 1-7. For example, one print job requiring black-and-white printing may require print production items having SKU identifiers 2, 4 and 5, while another print job requiring black-and-white printing may require print production items having SKU identifiers 1 and 7. Additional and/or alternate combinations may be used within the scope of this disclosure.

A layout may include five aisles, each having eight bins. Each bin may have approximately the same amount of space as the other bins, and print production items may be picked from only one side of the aisle. In an embodiment, a depot may be located near an upper left corner of a storage facility as illustrated, for example, by FIG. 5, FIG. 6 and FIG. 7. Additional and/or alternate storage facility layouts may be used within the scope of this disclosure.

Figure 8:
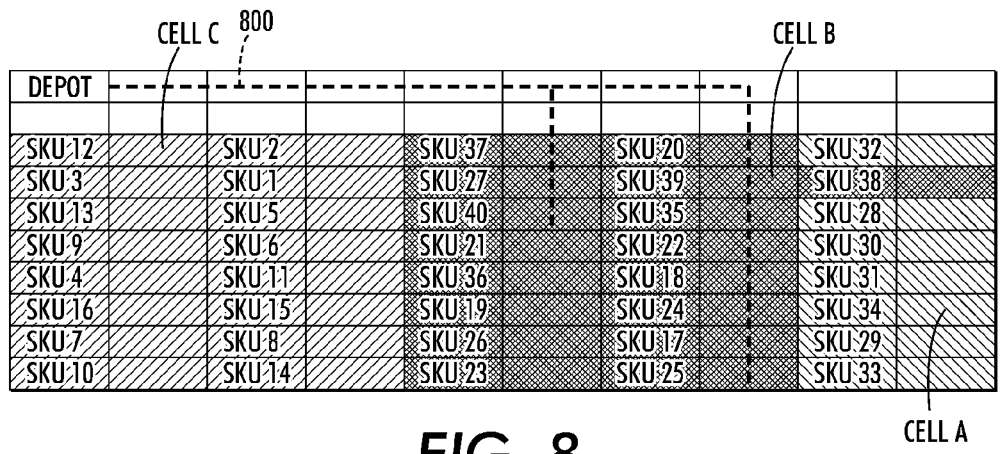
FIGS. 8 and 9 illustrate example sample paths an order-picker may take to pick print production items according to various embodiments.

In an embodiment, a return routing policy may be used to determine a distance traveled by an order-picker in picking one or more items to process one or more jobs. A return routing policy assumes that an order picker enters and leaves an aisle containing one or more items to be picked from the front side of the aisle. FIG. 8 illustrates a sample path 800 an order-picker may take to pick items 21, 24 and 25 from the layout illustrated in FIG. 5 according to an embodiment.

In an embodiment, 'Wa' may be defined as the horizontal center-to-center distance between an aisle and a storage bin. 'Lw' may be defined as the vertical center-to-center distance between bins. In another embodiment, 'Lw' may be defined as the distance from the center of a bin to the center of the space in front of an aisle. 'S' may be defined as the distance between the depot and the center of the space in front of the first aisle.

In an embodiment, a total distance, d, traveled by an order-picker in a tour may be represented by the following:

$$d = 2*(S + \text{across the aisle distance} + \text{within the aisle distance})$$

As illustrated by FIG. 8, to pick items 21, 24 and 25 in the layout illustrated in FIG. 5, an order-picker must travel the following distances:

1. Distance S from the depot to the center of the space in front of the first aisle
2. Four Wa units between Aisle 1 and Aisle 3
3. Four Lw units in Aisle 3 to retrieve Item 21
4. Two Wa unit between Aisle 3 and Aisle 4
5. Six Lw units in Aisle 4 to retrieve Item 24
6. Two Lw units in Aisle 4 to retrieve Item 25
7. Double the distances in 1-6 above to account for round-trip distances As such, the distance traveled by an order-picker to pick items 21, 24 and 25 may be represented as:

$$d = 2*(S + (6*Wa) + (12*Lw))$$

If S=20 distance units, Wa=1 distance units and Lw=1 distance units, the distance traveled by an order-picker to pick print production items 21, 24 and 25 in the layout illustrated in FIG. 5 may be represented as:

$$d = 2*(20 + (6*1) + (12*1)) = 76 \text{ distance units}$$

Figure 9:
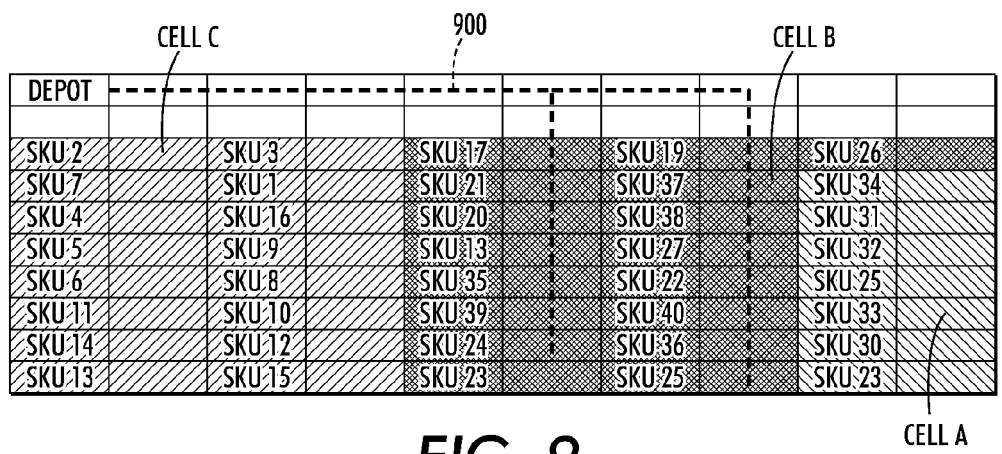

FIG. 9 illustrates a sample path 900 an order-picker may take to pick print production items 21, 24 and 25 from the layout illustrated in FIG. 7 according to an embodiment. A distance traveled by an order-picker in picking print production items 21, 24 and 25 in this layout may be determined in a similar way as described above. As illustrated by FIG. 9, to pick items 21, 24 and 25 in the layout illustrated in FIG. 7, an order-picker must travel the following distances:

1. Distance S from the depot to the center of the space in front of the first aisle
2. Four Wa units between Aisle 1 and Aisle 3
3. Two Lw units in Aisle 3 to retrieve Item 21
4. Five Lw in Aisle 3 to retrieve Item 24
5. Two Wa units between Aisle 3 and Aisle 4
6. Eight Lw units in Aisle 4 to retrieve Item 25
7. Double the distances in 1-6 above to account for round-trip distances As such, the distance traveled by an order-picker to pick items 21, 24 and 25 may be represented as:

$$d=2*(S+(6*Wa)+(15*Lw))$$

If S=20 distance units, Wa=1 distance units and Lw=1 distance units, the distance traveled by an order-picker to pick print production items 21, 24 and 25 in the layout illustrated in FIG. 7 may be represented as:

$$d=2*(20+(6*1)+(15*1))=82 \text{ distance units}$$

In an embodiment, a layout may be selected 220 based on an associated measure of distance traveled. For example, a layout associated with the smallest average measure of distance traveled for one or more pick orders may be selected as a layout. As another example, a layout associated with the smallest variance measure of distance traveled for one or more pick orders may be selected as a layout.

Figure 10:
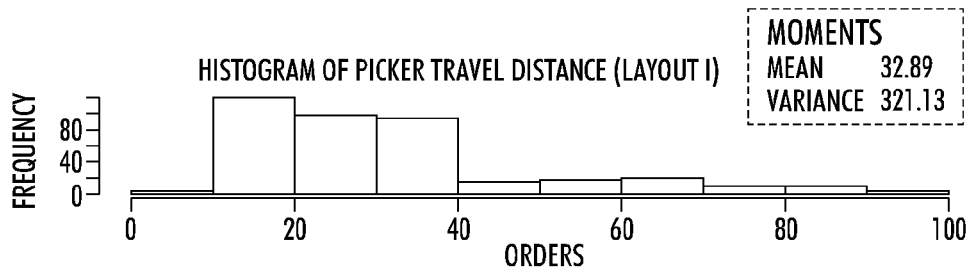
FIGS. 10-12 illustrate example histograms of travel distance according to various embodiments.
Figure 11:
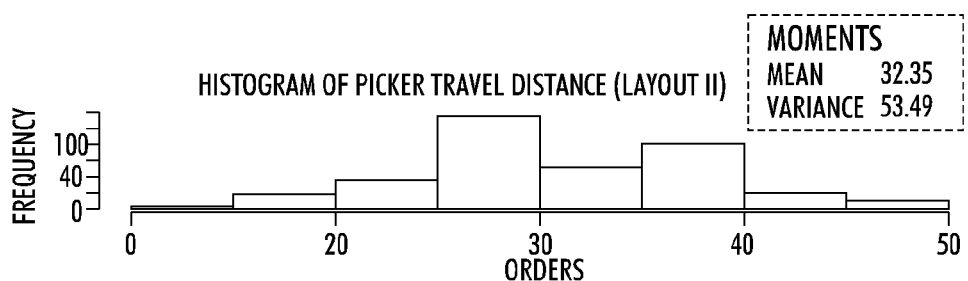
Figure 12:

FIG. 10 illustrates a histogram of travel distance for a sample of pick orders defined for the layout illustrated by FIG. 6 according to an embodiment. FIG. 11 illustrates a histogram of a travel distance for the sample of pick orders defined in Table 12 by the layout illustrated by FIG. 5 according to an embodiment. FIG. 12 illustrates a histogram of travel distance for the sample of pick orders defined in Table 12 by the layout illustrated by FIG. 7 according to an embodiment.

TABLE 12

| Job ID | Function | Bill of Material | | | |
|---|---|---|---|---|---|
| Order 1 | BWPrinting | SKU 1 | SKU 3 | SKU 6 | SKU 7 |
| Order 2 | Punch | SKU 17 | SKU 19 | | |
| Order 3 | CoilBind | SKU 22 | SKU 24 | SKU 27 | |
| Order 4 | BWPrinting | SKU 1 | SKU 4 | | |
| Order 5 | Punch | SKU 17 | SKU 20 | | |
| Order 6 | Mail | SKU 35 | SKU 36 | SKU 37 | SKU 39 SKU 40 |
| Order 7 | BwPrinting | SKU 2 | SKU 3 | | |
| Order 8 | Insert | SKU 29 | SKU 30 | SKU 31 | SKU 32 |
| Order 9 | Mail | SKU 35 | SKU 37 | SKU 38 | |
| Order 10 | ColorPrinting | SKU 10 | SKU 11 | SKU 14 | SKU 16 |
| Order 11 | Punch | SKU 17 | SKU 20 | | |
| Order 12 | CoilBind | SKU 23 | SKU 26 | | |

In an embodiment, a storage facility may be arranged 222 according to the selected layout. Information pertaining to a layout may be sent to a warehouse manager or other person or entity, who may direct item pickers to place items in the correct location based on the layout.

Figure 13:
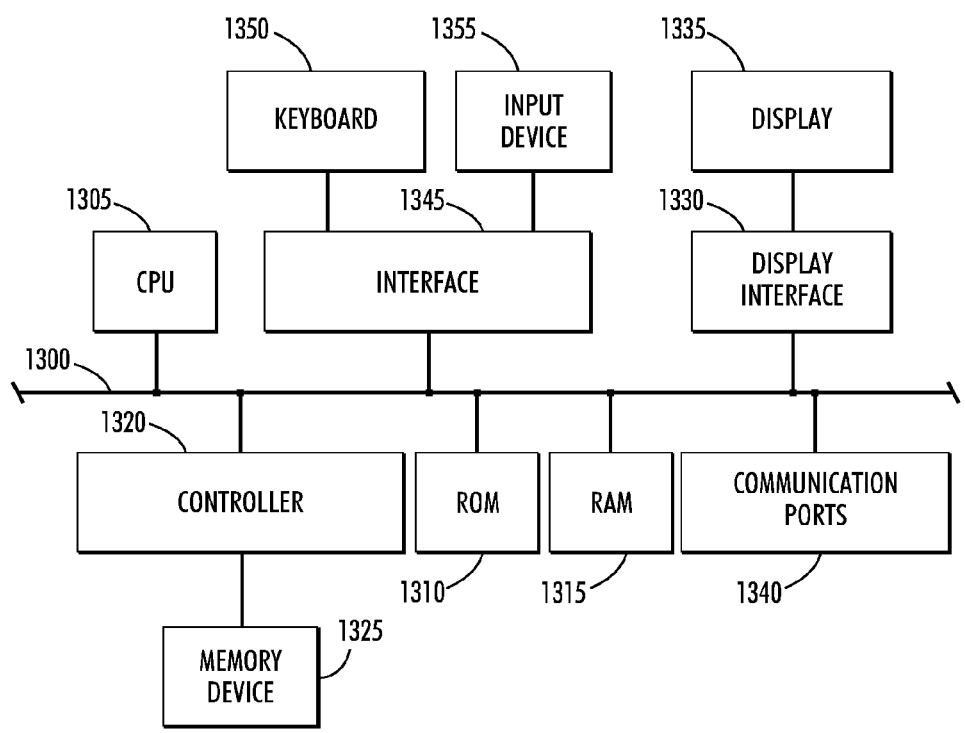
FIG. 13 is a block diagram depicting elements that may be present in an electronic device or a computing device.

FIG. 13 depicts a block diagram of internal hardware that may be used to contain or implement the various services and processing devices as discussed above. A bus 1300 serves as the main information highway interconnecting the other illustrated components of the hardware. CPU 1305 is a processor, the central processing unit of the system that performs calculations and logic operations required to execute a program. CPU 1305, alone or in conjunction with one or more of the other elements disclosed in FIG. 13, is a processing device, computing device or processor as such terms are used within this disclosure. Read only memory (ROM) 1310 and random access memory (RAM) 1315 constitute exemplary memory devices.

A controller 1320 provides an interface between with one or more optional tangible, non-transitory computer-readable memory devices 1325 and the system bus 1300. These memory devices 1325 may include, for example, an external or internal DVD or CD ROM drive, a hard drive, flash memory, a USB drive or the like. As indicated previously, these various drives and controllers are optional devices. Additionally, the memory devices 1325 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the methods and systems as discussed above may be stored in the ROM 1310 and/or the RAM 1315. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 1330 may permit information from the bus 1300 to be displayed on the display 1345 in audio, visual, graphic or alphanumeric format. The information may include information related to a current job ticket and associated tasks. Communication with external devices may occur using various communication ports 1340. An exemplary communication port 1340 may be attached to a communications network, such as the Internet or an local area network.

The hardware may also include an interface 1345 which allows for receipt of data from input devices such as a keyboard 1350 or other input device 1355 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:
1. A method of determining a location of one or more print production items in a storage facility, the method comprising:
    identifying one or more print production items used by one or more autonomous production cells in a print shop;
    determining, by a computing device, a demand value associated with each of the identified print production items, wherein the demand value represents a frequency with which the print production item is used by the one or more autonomous production cells over a period of time;
    grouping the identified print production items into one or more groups based on the autonomous production cell that uses the identified print production items by:
        grouping the identified print production items used exclusively by one autonomous production cell into a first group, and
        grouping the identified print production items used by a plurality of autonomous production cells into a second group;
    assigning each of the first group and the second group to an autonomous storage cell; and determining, by the computing device, a location of one or more autonomous storage cells based on the demand values associated with the print production items in the group associated with the autonomous storage cell.

2. The method of claim 1, wherein identifying one or more print production items comprises:
   identifying a print-related function to be performed;
   identifying one or more print production items that are needed by one or more print devices in the one or more autonomous production cells to perform the print-related function; and
   selecting one or more of the identified print production items.

3. The method of claim 1, wherein identifying one or more print production items comprises:
   receiving information associated with a stock keeping unit associated with the one or more print production items; and
   identifying the one or more print production items based at least in part on the associated stock keeping unit.

4. The method of claim 1, wherein identifying one or more print production items comprises identifying one or more print production items based on, at least in part, historical print job demand information associated with the one or more autonomous production cells.

5. The method of claim 1, wherein determining a location of each autonomous storage cell in a storage facility comprises:
   for each autonomous storage cell, determining a total item frequency value associated with the autonomous storage cell by summing the demand values of the print production items associated with the autonomous storage cell; and
   assigning the autonomous storage cell having a highest total item frequency value a location closest to a depot in the storage facility.

6. The method of claim 5, further comprising assigning the autonomous storage cell having a next highest total item frequency value a next closest location to the depot.

7. The method of claim 1, further comprising, for each autonomous storage cell, determining a location of each print production item associated with the autonomous storage cell within the location of the autonomous storage cell.

8. The method of claim 7, wherein determining a location of each print production item comprises randomly assigning each print production item a location within the autonomous storage cell location.

9. The method of claim 7, wherein determining a location of each print production item comprises assigning each print production item a location within the autonomous storage cell location using a COI policy.

10. A system of determining a location of one or more print production items in a storage facility, the system comprising:
    a computing device; and
    a computer-readable storage medium in communication with the computing device, wherein the computer-readable storage medium comprises one or more programming instructions that, when executed, cause the computing device to:
      identify one or more print production items used by one or more autonomous production cells in a print shop,
      determine a demand value associated with each of the identified print production items, wherein the demand value represents a frequency with which the print production item is used by the one or more autonomous production cells over a period of time,
      group the identified print production items into one or more groups based on the autonomous production cell that uses the identified print production items by:
        grouping the identified print production items used exclusively by one autonomous production cell into a first group, and
        grouping the identified print production items used by a plurality of autonomous production cells into a second group,
      assign each of the first group and the second group to an autonomous storage cell, and
      determine a location of one or more autonomous storage cells based on the demand values associated with the print production items in the group associated with the autonomous storage cell.

11. The system of claim 10, wherein the one or more programming instructions that, when executed, cause the computing device to identify one or more print production items comprise one or more programming instructions that, when executed, cause the computing device to:
    identify a print-related function to be performed;
    identify one or more print production items that are needed by one or more print devices in the one or more autonomous production cells to perform the print-related function; and
    select one or more of the identified print production items.

12. The system of claim 10, wherein the one or more programming instructions that, when executed, cause the computing device to identify one or more print production items comprise one or more programming instructions that, when executed, cause the computing device to:
    receive information associated with a stock keeping unit associated with the one or more print production items; and
    identify the one or more print production items based at least in part on the associated stock keeping unit.

13. The system of claim 10, wherein the one or more programming instructions that, when executed, cause the computing device to identify one or more print production items comprise one or more programming instructions that, when executed, cause the computing device to identify one or more print production items based on, at least in part, historical print job demand information associated with the one or more autonomous production cells.

14. The system of claim 10, wherein the one or more programming instructions that, when executed, cause the computing device to determine a location of each autonomous storage cell in a storage facility comprise one or more programming instructions that, when executed, cause the computing device to:
    for each autonomous storage cell, determine a total item frequency value associated with the autonomous storage cell by summing the demand values of the print production items associated with the autonomous storage cell; and
    assign the autonomous storage cell having a highest total item frequency value a location closest to a depot in the storage facility.

15. The system of claim 14, wherein the computer-readable storage medium further comprises one or more programming instructions that, when executed, cause the computing device to assign the autonomous storage cell having a next highest total item frequency value a next closest location to the depot.

16. The system of claim 10, the computer-readable storage medium further comprises one or more programming instructions that, when executed, cause the computing device to, for each autonomous storage cell, determine a location of each print production item associated with the autonomous storage cell within the location of the autonomous storage cell.

17. The system of claim 16, wherein the one or more programming instructions that, when executed, cause the computing device to determine a location of each print production item comprise one or more programming instructions that, when executed, cause the computing device to randomly assign each print production item a location within the autonomous storage cell location.

18. The system of claim 16, wherein the one or more programming instructions that, when executed, cause the computing device to determine a location of each print production item comprise one or more programming instructions that, when executed, cause the computing device to assign each print production item a location within the autonomous storage cell location using a COI policy.

* * * * *